US008600674B1

(12) United States Patent
Barbeau et al.

(10) Patent No.: US 8,600,674 B1
(45) Date of Patent: Dec. 3, 2013

(54) USING PATTERN RECOGNITION IN REAL-TIME LBS APPLICATIONS

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US)

(73) Assignee: University of South Florida, Tampa, FL (US)

( * ) Notice: Subject to any disclaimer, the term of this patent is extended or adjusted under 35 U.S.C. 154(b) by 1026 days.

(21) Appl. No.: 12/192,339

(22) Filed: Aug. 15, 2008

Related U.S. Application Data

(60) Provisional application No. 60/955,999, filed on Aug. 15, 2007.

(51) Int. Cl.
*G01C 21/00* (2006.01)

(52) U.S. Cl.
USPC ........... 701/524; 701/400; 701/408; 701/424;
701/481; 701/521; 706/6; 706/15; 706/56;
340/988; 340/995.25; 700/48; 700/66; 700/69;
342/357.43

(58) Field of Classification Search
USPC ......... 701/25, 27, 116, 207, 208, 225, 23, 36,
701/117, 400, 408, 409, 410, 411, 412, 414,
701/423, 424, 472, 481, 495, 520, 521, 524,
701/527, 300; 706/2, 5, 6, 15, 45–62, 900;
340/988–994, 995.25; 700/13, 48, 50,
700/56, 58, 64, 66, 69, 70, 113;
342/357.43, 457; 455/11.1, 95, 404.2,
455/414.2, 422, 422.1, 440, 446, 456,
455/456.1, 456.2, 456.5, 456.6, 457
See application file for complete search history.

(56) References Cited

U.S. PATENT DOCUMENTS

| 6,140,964 | A  | * | 10/2000 | Sugiura et al. | 342/464 |
| 6,148,211 | A  | * | 11/2000 | Reed et al. | 455/456.2 |
| 6,266,514 | B1 | * | 7/2001 | O'Donnell | 455/67.13 |
| 6,473,038 | B2 | * | 10/2002 | Patwari et al. | 342/450 |
| 7,076,259 | B2 | * | 7/2006 | Belcea | 455/456.1 |
| 7,487,017 | B1 | * | 2/2009 | Bell et al. | 701/27 |
| 7,739,033 | B2 | * | 6/2010 | Murata et al. | 701/468 |
| 7,812,766 | B2 | * | 10/2010 | Leblanc et al. | 342/457 |
| 7,873,368 | B2 | * | 1/2011 | Goren | 455/456.1 |

(Continued)

OTHER PUBLICATIONS

Aguilar, D.P.; Barbeau, S.J.; Labrador, M.A.; Perez, A.J.; Perez, R.A.; Winters, P.L. 1992. Quantifying Position Accuracy of Multimodal Data from Global Positioning System-Enabled Cell Phones. Transportation Research Record. pp. 54-60.

(Continued)

*Primary Examiner* — Rami Khatib
(74) *Attorney, Agent, or Firm* — Molly Sauter; Smith & Hopen, P.A.

(57) ABSTRACT

A prediction method that estimates the real-time position of a mobile device based on previously observed data is provided. The present invention can be used in real-time navigation, including providing real-time alerts of an upcoming destination and notifications of emergency events in close geographic proximity. The prediction method utilizes neural networks and/or functions generated using genetic algorithms in estimating the mobile device's real-time position. The prediction method provides reliable Location-Based Services (LBS) in events where traditional positioning technologies become unreliable. It is also seamless, as the user remains unaware of any interruption in accessing the positioning technology.

41 Claims, 7 Drawing Sheets

(56) References Cited

U.S. PATENT DOCUMENTS

| | | |
|---|---|---|
| 2003/0134648 A1 | 7/2003 | Reed et al. |
| 2004/0075606 A1* | 4/2004 | Laiho et al. .............. 342/357.1 |
| 2005/0197139 A1* | 9/2005 | Misikangas et al. ....... 455/456.1 |
| 2007/0034107 A1 | 2/2007 | Barbeau et al. |
| 2008/0248815 A1* | 10/2008 | Busch ...................... 455/456.5 |
| 2009/0209271 A1* | 8/2009 | Reed et al. ................ 455/456.6 |
| 2009/0248288 A1* | 10/2009 | Bell et al. ...................... 701/200 |

OTHER PUBLICATIONS

Akoush, S. 2007. Mobile User Movement Prediction Using Bayesian Learning for Neural Networks. American University in Cairo. http://www.gisdevelopment.net/proceedings/mapmiddleeast/2007/technology/GPS/mme07_Sherif.pdf.

* cited by examiner

USING PATTERN RECOGNITION IN REAL-TIME LBS APPLICATIONS

CROSS REFERENCE TO RELATED APPLICATIONS

This application claims priority to currently pending U.S. Provisional Patent Application Ser. No. 60/955,999, filed Aug. 15, 2007.

FIELD OF INVENTION

This invention relates to a pattern recognition system used to estimate a mobile device's location during periods when positioning technology is unavailable.

BACKGROUND

Recent advances in cell phones and mobile technology provide opportunities for new and improved services to the end user. One set of these services is referred to as Location-Based Services (LBS), which is provided based on contextual information from a user's or object's geographic location. These services can vary from navigation applications and location-based emergency alerts, such as traffic accident or hurricane evacuation notifications, to friend finders that alert users when they are in close proximity to a friend. They are often associated with Global Positioning Systems (GPS)-enabled cell phones, but other devices such as telemetry units or wireless sensors may also be part of an LBS system.

LBS are based on various positioning technologies, including assisted GPS, cellular network triangulation or trilateration, or a hybrid of these and other methods. These technologies all rely on wireless communications, and, therefore, there is an inherent amount of uncertainty when determining a user's position in real-time. This uncertainty grows as positioning technologies are disrupted, such as when a GPS-enabled cell phone goes indoors, into a tunnel, in a vehicle, in an urban canyon, or is otherwise shielded or prevented from obtaining a location fix. This disruption may also be accompanied by a disruption in communication technology that the device uses to communicate with a server. In these circumstances, the real-time position of the cell phone is unknown.

When the knowledge of the geographic position is lost, certain techniques can be performed that provide an estimate of where the device is currently located. This is commonly referred to as dead-reckoning, and is most common in devices that utilize technology such as accelerometers in addition to a positioning technology, such as GPS. GPS provides the overall knowledge of where the device is located, but accelerometers may be used when GPS is lost by measuring small changes in the device's acceleration and, therefore, computing a new estimated location as a distance from the last known location. Accelerometers are also used for power conservation because they utilize much less power than a GPS system. In order to save power, a device may lie dormant and observe only its accelerometers. When acceleration is detected (which implies movement), the GPS system is turned on and attempts to determine the device's location. This saves power over continuously polling the GPS for a location when the device is sitting still. However, certain resource-constrained mobile devices, such as cell phones, may not have built-in accelerometers, or they may not be accessible to software applications running on the phone or server-side components. In these situations, a new method is needed to accurately estimate a device's location to provide reliable and transparent LBS to end-users of a mobile device based on immediate, recent, and/or archived data.

SUMMARY OF INVENTION

Advances in location-based services (LBS) provide the ability to predict or estimate the real-time location of certain mobile device. However, this capability requires an accelerometer and certain resource-constrained mobile devices, such as cell phones, may not have built-in accelerometers, or they may not be accessible to software applications running on the phone or server-side components. The present invention provides a method of predicting the real-time location of a mobile device and does not require an accelerometer. Therefore, it can be run on resource-constrained mobile devices, such as cell phones.

In an embodiment of the present invention, a method of predicting the real-time location of a mobile device is provided. The prediction method comprising collecting location data having a plurality of location records, generating a trip model using the location data, inputting one of the plurality of location records to the trip model and determining the estimated location from the trip model. The mobile device may be any device capable of determining location data. The plurality of location records may each comprise a plurality of location information chosen from the group consisting of location coordinates, time of day, day of week, date, wireless signal strength, speed, traffic delay time, and direction heading. Preferably, the location record inputted into trip model is the most recent location record. The estimated location may be given in latitude and longitude coordinates.

In an embodiment of the prediction method, generating a trip model comprises building a neural network and training the neural network using location data or determining a function using a genetic algorithm that models the location data.

In an embodiment, the prediction method further comprises collecting the location data of at least one nearby mobile device; determining the distance between the mobile device and the at least one nearby mobile device; and storing the distance in the corresponding location records of the gathered location data.

In another embodiment of the present invention, a method of predicting the real-time location of a mobile device and using the prediction to send alerts to the user of the mobile device is provided. The general notification method comprising collecting location data, comprising a plurality of location records, generating a trip model, having at least one output, using the location data, and determining the output of the trip model, wherein the output may be an alert.

In an embodiment of the general notification method, generating a trip model comprises building a neural network, training the neural network using the location data, inputting one of the plurality of location records to the trained neural network, determining the estimated location from the trained neural network, and determining if output should be an alert.

In an embodiment of the general notification method, generating a trip model comprises determining function using a genetic algorithm that models the location data, inputting one of the plurality of location records to the function generated by the genetic algorithm, determining the estimated location from the function generated by the genetic algorithm, and determining if the output should be an alert.

In an embodiment of the general notification method, determining if output should be an alert comprises determining the mobile device's destination, determining at least a first trigger area around mobile device's destination, comparing the estimated location of the mobile device and at least the first trigger area, and making the output an alert when the estimated location first intersects each trigger area.

In an embodiment of the general notification method, determining if output should be an alert comprises determining a traffic incident's location, determining at least a first trigger area around the traffic incident's location, comparing the estimated location of the mobile device and at least the first traffic incidents location, and making the output an alert when the estimated location first intersects each trigger area.

In another embodiment of the present invention, a method of predicting the real-time location of a mobile device used on a transit system, such as a bus or train, and using the prediction to send alerts to the user of the mobile device is provided. The transit alert method comprising collecting mobile device's location data, comprising a plurality of mobile device location records; collecting a transit system's location data comprising a plurality of transit system location records, generating a trip model, having at least one output, using the transit system's location data, and determining the output of the trip model. The transit system location data may be collected from an automatic vehicle location service, an archive of the mobile device's previous trips on the transit system, an archive of historic trips of the transit system, and/or the transit system's schedule of arrival and departure times and locations.

In an embodiment of the transit alert method, generating a trip model comprises building a neural network, training the neural network using the transit system's location data, inputting one of the plurality of mobile device's location records into the trained neural network, determining the estimated location from the trained neural network, and determining if the output should be an alert.

In an embodiment, generating a trip model comprises utilizing a genetic algorithm to generate a function that represents a model of the transit system's location data, inputting one of the plurality of mobile device's location records to the function generated by a genetic algorithm, determining the estimated location from the function generated by a genetic algorithm, and determining if output should be an alert.

In an embodiment, the method further comprises modifying the trip model to reflect the mobile device's location data, wherein modifying the trip model comprises building a neural network, training the neural network using patterns in the transit system's location data and the mobile device's location data, inputting the last known location record of the mobile device to the trained neural network, determining the estimated location from the trip model; and determining if the output should be an alert.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes a prediction method that estimates the real-time position of a mobile device based on previously observed data. The present invention can be used in real-time navigation, including providing real-time alerts of an upcoming destination and notifications of emergency events in close geographic proximity. The prediction method provides reliable Location-Based Services (LBS) in events where traditional positioning technologies become unreliable, such as Global Positioning Systems (GPS) in urban canyons or tunnels. It is also seamless, as the user remains unaware of any interruption in accessing the positioning technology.

Figure 1A:
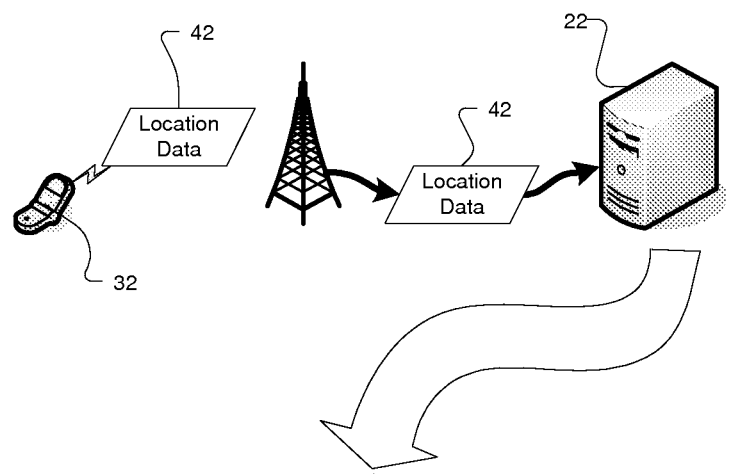
FIG. 1 is a series of diagrams illustrating an embodiment of the present invention in which the trip model is kept on the server.
Figure 1B:
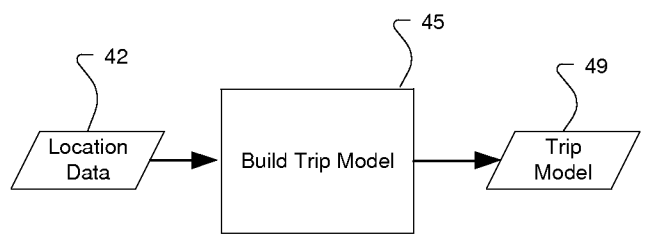
Figure 1C:
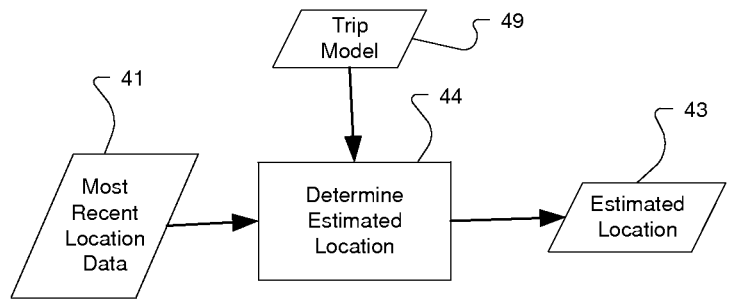
Figure 1D:
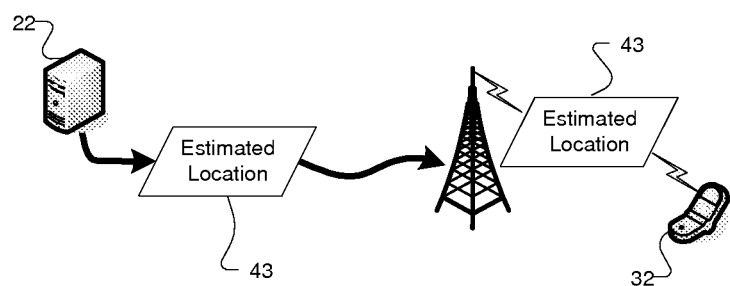

In an embodiment of the present invention, as illustrated in FIG. 1A, the prediction method comprises collecting location data 42 from mobile device 32 and storing location data on server 22. As shown in FIG. 1B, the prediction method further comprises generating 45 trip model 49 using patterns in stored location data 42, and, as shown in FIG. 1C, predicting mobile device's 32 real-time location 42 using trip model 49 and most recent location data 41 of mobile device 32. Then, as shown in FIG. 1D, predicted/estimated location 43 is transferred to mobile device 32.

The system may use server 22 and mobile device 32 or just mobile device 32. Building trip model 49 may be resource intensive and, depending on the capability of mobile device 32, may need to be performed on server 22. Real-time prediction/estimation calculations 44 may take place on either server 22 or mobile device 32.

Figure 2A:
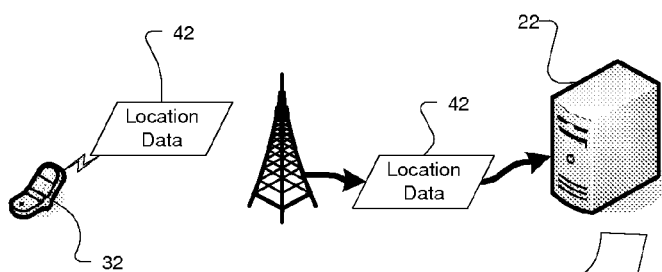
FIG. 2 is a series of diagrams illustrating an embodiment of the present invention in which the trip model is built on the server and then transferred to the mobile device.
Figure 2B:
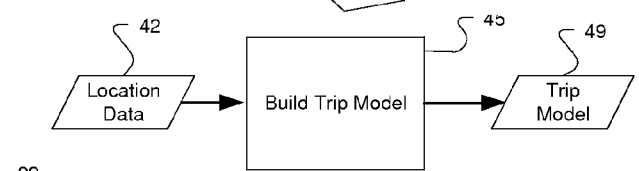
Figure 2C:
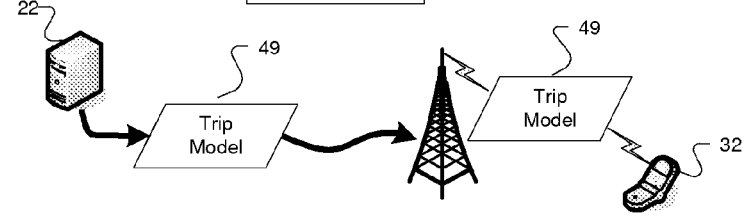
Figure 2D:
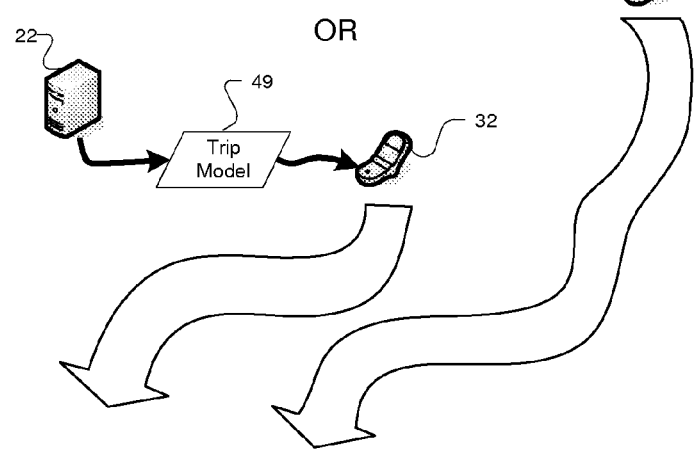
Figure 2E:
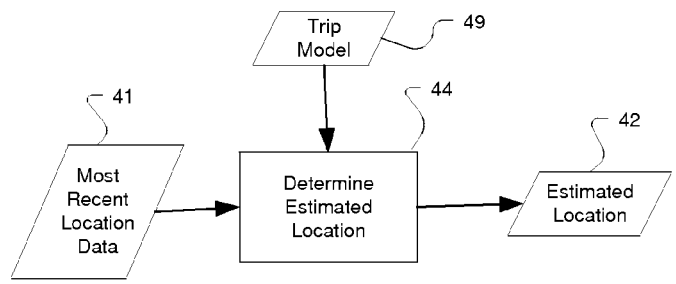

In the embodiment illustrated in FIG. 1, trip model 49 is built on server 22 and prediction calculations take place on server 22. Server 22 then sends calculated positions to mobile device 32. FIG. 2 illustrates an embodiment of the present invention in which trip model 49 is built 45 on server 22 and then prediction/estimation calculations 44 take place on mobile device 32. As shown in FIG. 2A, the prediction method comprises collecting location data 42 from mobile device 32 and storing location data on server 22. As shown in FIG. 2B, the prediction method further comprises generating trip model 49 using patterns in stored location data 42. As shown in FIG. 2C, the prediction method further comprises transmitting model 49 to mobile device 32. As an alternative, as shown in FIG. 2D, trip model 49 can be directly loaded onto mobile device 32 instead of transmitting model 49 over a network. Then, as shown in FIG. 2E, mobile device 32 can use trip model 49 to predict mobile device's 32 real-time location using its most recent location data 42.

Mobile device 32 can be any device capable of transmitting location data 42, such as a GPS-enabled cell phone, laptop, or Personal Digital Assistant (PDA).

In an embodiment of the present invention, trip model 49 is generated using a neural network. Neural networks are used to 'learn' based on patterns in past location data 42. When new real-time data is fed into the network, the neural network provides predictions on what the expected output should be for these new values. The predictions become valuable when the traditional positioning technologies become unavailable. A number of neural network designs may be used, as shown in the examples of FIGS. 3-6. The neural network is trained using observed position and other data from mobile device and/or other sources of location data. Once the network models the behavior correctly, the trip model is saved. Real-time data is then fed into the network by the device and/or server, and the output is the estimated position. Input values, including position, may be normalized to improve performance.

Neural network setup 47 comprises input layer 61, plurality of hidden layers 62, and output layer 63. Input layer 61 takes location data, which may comprise current time 66, current wireless signal strength 67, previous N times 68, previous N wireless signal strength 69, last known position 70, last known speed 71, and last known heading 72, as input. These are not meant to be limiting, as other types of location data are anticipated by the present invention.

Figure 3:
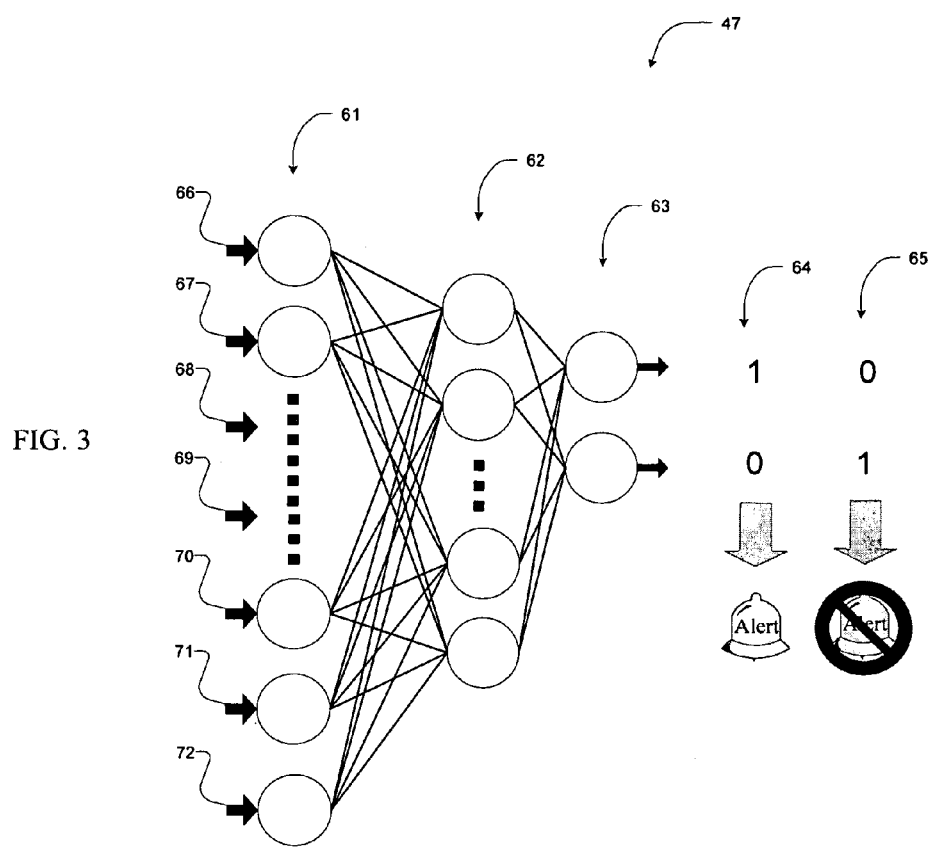
FIGS. 3-6 are a series of diagrams illustrating the use of neural networks for pattern recognition in accordance with the present invention.
Figure 4:
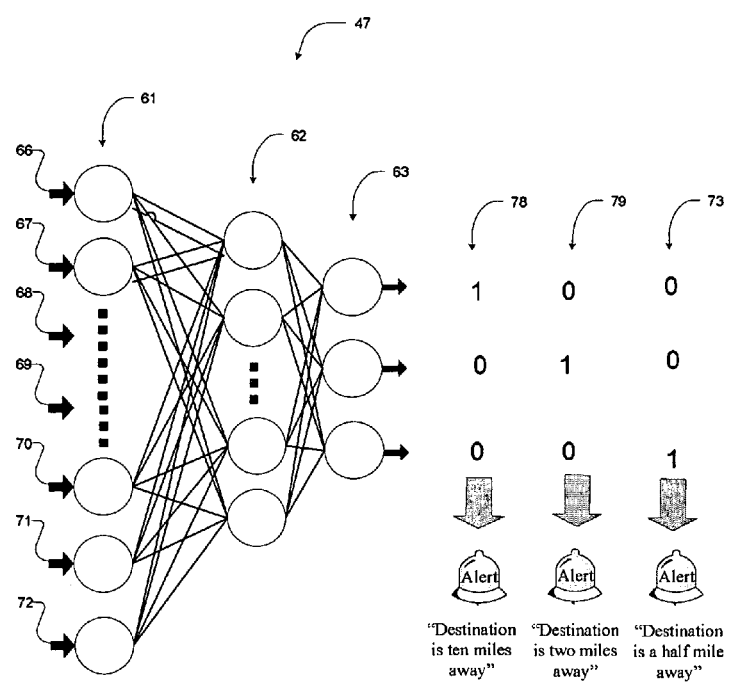
Figure 5:
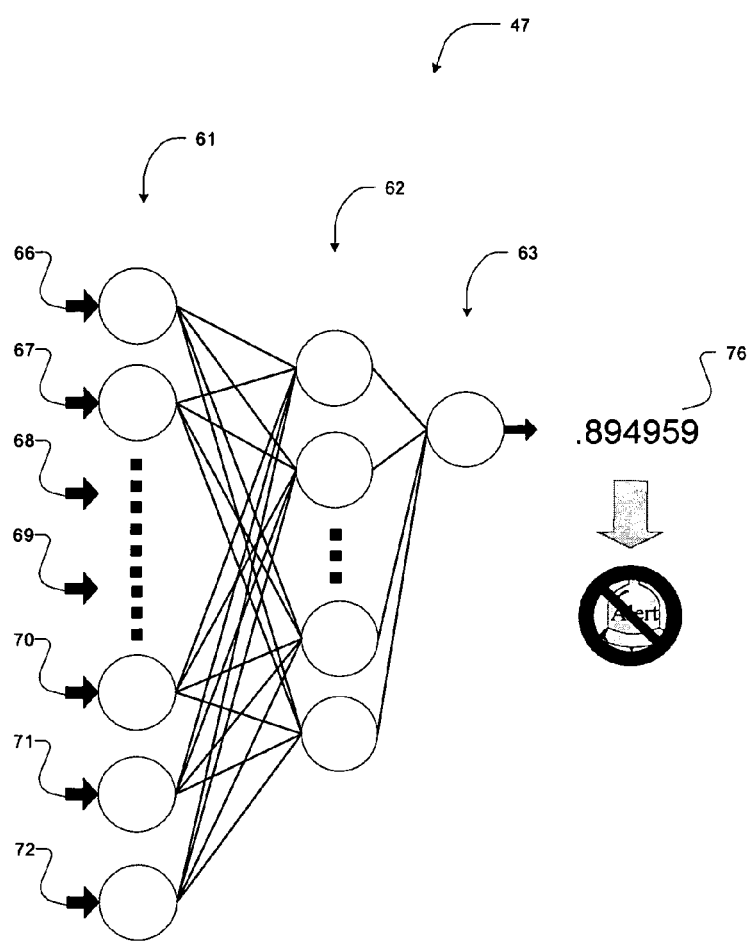

Output layer 63 may consist of any number of outputs. By way of example, output layer 63 may consist of two outputs each having a value of '1' or '0', as shown in FIG. 3. In this manner, up to four events can be triggered by causing outputs of '00', '01', '10', and '11'. For instance, if a real-time alert must be sent to the user when user comes within close proximity, then an output layer value of '10' 64 may be set to trigger an alert and an output layer value of '01' 65 may be set to not trigger an alert. As another example, output layer 63 may consist of three outputs each having a value of '1' or '0', as shown in FIG. 4. In this manner, up to eight events can be triggered. For instance, if a number of real-time alerts must be sent to the user as the user approaches his destination, then output layer 63 value of '100' 78 could be set to trigger an alert that the stop is ten miles away (or some distance far away), an output layer value of '010' 79 could be set to trigger an alert that the stop is two miles away (or some distance closer), and an output layer 63 value of '001' 73 could be set to trigger an alert that the stop is a half mile away (or a close distance). As another example, output layer 63 may only consist of one output 76 having a value between 0 and 1, as shown in FIG. 5. Values of 0 or 1 trigger an alert and other values in between do not trigger an alert.

Figure 6:
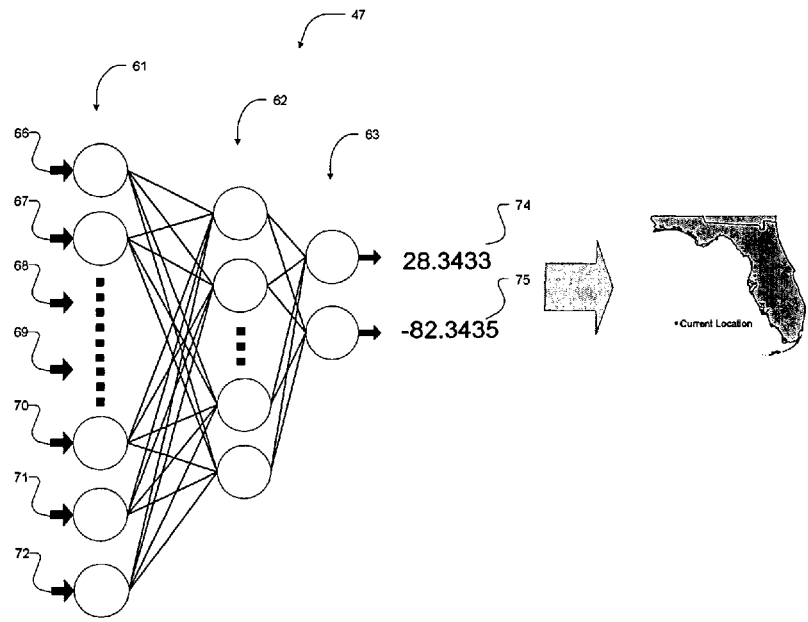

In addition, output layer 63 may consist of other values besides zeroes and ones. By way of example, as shown in FIG. 6, output layer 63 may consist of two outputs, the first having a value 74 between −90.0000 and 90.00000 and the second having a value 75 between −180.0000 and 180.0000. In this manner, the neural network could determine the predicted location of the mobile device and output latitude 74 and longitude 75 coordinates of the predicted location.

In an embodiment of the present invention, the model is generated using a genetic algorithm (GA). A GA requires fewer resources than a neural network and, therefore, may be used to reduce the load on a mobile device. A GA can be used to build a function that approximates the output of a more resource intensive tool, such the neural network or a very complex mathematical function that involves integration or derivation. A GA attempts to use a 'biological system' approach to create a function that approximates a model. A GA constructs an approximated function by using the building blocks of simple functions like sine and cosine, along with coefficients for each function and joining them with operators such as multiplication, division, addition, and subtraction, to build a more slightly complex function. The constructed function approximates the input and output relationship of something similar to a neural network. As each random solution is tested, the combinations that are closest to the correct answer are kept, and the ones producing the most incorrect answers are thrown away. Some of the population are mutated and re-combined in order to generate new population sets for the next round. This process continues until it converges on a solution, which means the output of one of the generated functions is near the correct known output. This constructed function is less complex and less resource intensive than the original function it is approximating, but can still be used to approximate an output to a sufficient accuracy for a given input.

In an embodiment of the present invention, the GA can build the function on the server, and then the function can be transferred to the mobile device, where values can be fed into the function in real-time. This approximated function involves far fewer calculations than that required by the neural network, which mean it can run on resource-constrained mobile devices to perform real-time pattern recognition techniques to estimate its own current real-time position independent of any real-time communication with a server-side entity. The function is pre-loaded onto the mobile device before the transit rider begins his trip, so if later in the trip the device loses positioning capabilities, it can use the function to approximate its position or a command. This also allows the mobile device to be completely autonomous, so even if communication is lost with the server, it can estimate its current position or a command related to that position in real-time.

Figure 7:
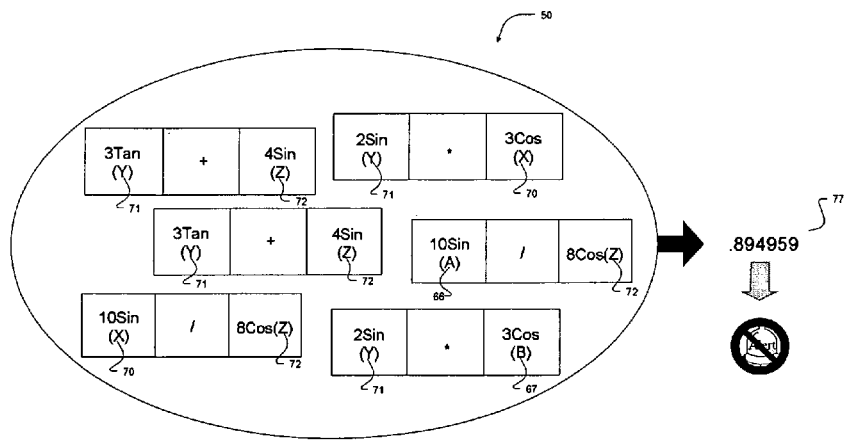
FIG. 7 is a diagram illustrating the use of a genetic algorithm for pattern recognition in accordance with the present invention.

An example of the conceptual topology of a GA 50 used in an embodiment of the present invention is shown in FIG. 7. The input values to GA 50 are location data, which may comprise current time 66, current wireless signal strength 67, previous N times, previous N wireless signal strength, last known position 70, last known speed 71, and last known heading 72. These are not meant to be limiting, as other types of location data are anticipated by the present invention. These values are manipulated by functions, such a sin, cos, and tan, which are then multiplied by a coefficient and then combined by operators, such as addition and division. After many evolutions and convergence, this particular example converged at $$\frac{10\sin(A)}{4\cos(B)} \ldots + 32\sin(X) + \frac{3\tan(Y)}{94\tan(Z)}.$$

Here, when the real-time data is fed in to the equation, an alert is triggered when output value 77 is above a certain threshold, e.g. near the value 1.

To increase processing capabilities of the present invention, distributed parallel processing solutions on multiple machines or phones is also possible. Pattern recognition techniques can also be used for power and bandwidth saving similar to the way accelerometers are used in combination with GPS. If it is observed that a mobile device is usually still at a specific date and/or time, then the system can poll the mobile device's real location at a lesser rate, saving both battery power and network bandwidth. Similarly, if it is anticipated that a device will be moving only at a specific time and day of week (e.g. the normal work commute to and from home during rush hours during the week), then the system can avoid querying its position until the time is reached when it is normally moving.

In an embodiment of the present invention, the prediction method further comprises collecting wireless signal strength. The wireless signal may be a GPS signal or cellular signal. The prediction method uses patterns in the signal strength to incorporate it into the trip model. This takes advantage of the absence of a wireless signal when trying to estimate the mobile device's current position.

In an embodiment of the present invention, the prediction method further comprises collecting traffic data. The prediction method uses patterns in the data to incorporate traffic into the trip model.

In an embodiment of the present invention, the prediction method further comprises collecting location data on nearby mobile devices. When location data of nearby mobile devices is available, the prediction method estimates the current position of the mobile device by using common patterns of movement for the nearby devices. It does this by incorporating the patterns into the trip model. This 'shared positioning' technique can take advantage of any patterns that emerge during normal operations, whether it is detected wireless signal strength from each neighbor or an estimate of its distance from its neighbor. This process can also be distributed and executed in parallel on multiple mobile devices to reduce processing load on any one mobile device.

Positioning technologies outages can be mitigated by the prediction method. Some mobile devices require communication with a server-side component to obtain their geographic location. If this component fails, the device cannot determine its position. Mobile device can use the prediction method to provide basic LBS while the actual positioning technology is down.

The prediction method can be used for any type of travel, including transit system travel with relatively regular timing and travel patterns, such as buses or trains, normal daily travel, such as to and from work, and extra-ordinary trips, such as day trips or vacations.

Figure 8A:
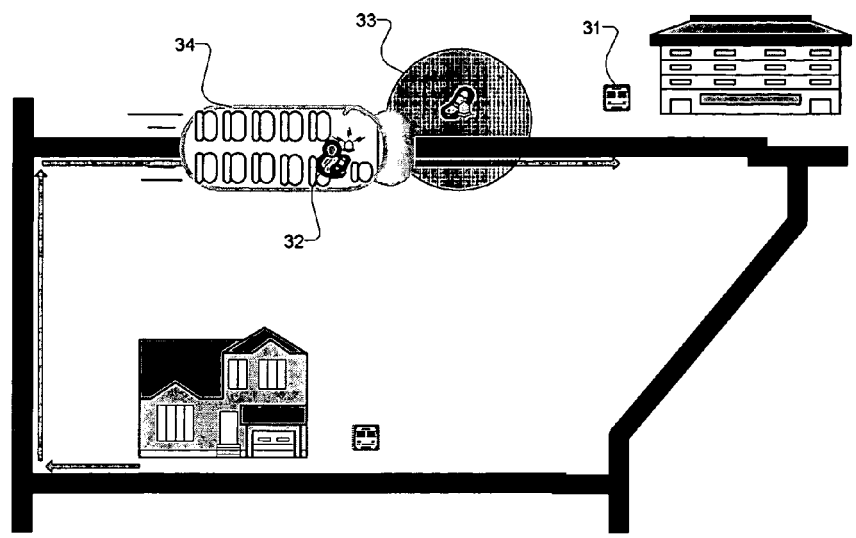
FIG. 8 is a series of diagrams illustrating an example of real-time navigation using a normal service (FIG. 8A) and using a pattern recognition service (FIG. 8B) of the present invention.
Figure 8B:
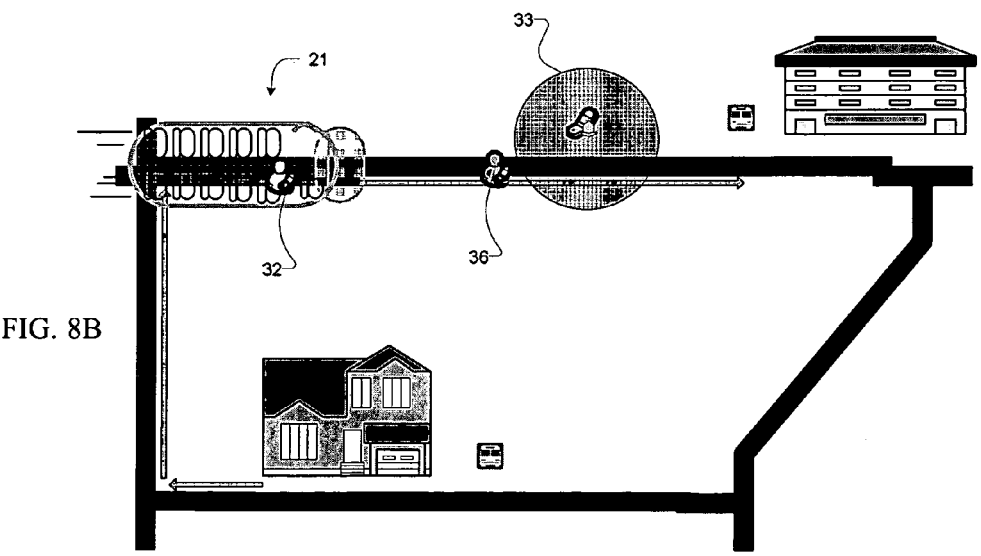

For regularly scheduled travel, the prediction method may use archived data. The method uses a neural network or GA to learn individual routes and delay patterns. FIG. 8A illustrates mobile device 32 with normal service and FIG. 8B illustrates the use of the prediction method in the absence of normal mobile device service. This example shows the present method as implemented for regularly scheduled travel using bus 34 as an example of the transportation. In FIG. 8, mobile device 32 is used to alert a rider when to get off bus 34. In FIG. 8A, mobile device 32 has normal services and mobile device 32 gives an alert as bus 32 enters trigger area 33, an area in close proximity to user's destination, bus stop 31. In FIG. 8B, the actual position of mobile device 32 is unknown, but server or mobile device 32 uses data from previously recorded personal trips or bus trips to estimate current location 36 and still provide reliable service. The last known position 21 of mobile device 32 and the time elapsed is utilized to determine when mobile device 32 has entered trigger area 33. The method may utilize publicly available Automatic Vehicle Location (AVL) systems to provide a more reliable result. The method may also use the historic geographic location of bus 34 as input data and the scheduled and actual arrival and departure times for the publication transportation system.

If it is observed that the mobile device's 32 signal strength drops out completely a certain period of time before the user should be alerted to exit bus 34, signal strength may be used as one of the parameters used to predict when to alert the user to exit bus 34. In addition, an even more reliable service is provided if it is known that a particular route usually is delayed by rush hour traffic. The prediction method can then wait slightly longer before cuing the rider to get off bus 34 than it would on a different route that is not usually delayed. This slight intentional delay will provide a more reliable service by ensuring that the rider still requests a stop at an appropriate geographic location.

For normal daily travel in which a user frequently travels a route at a given time, the prediction method may build a general model of the 'normal' location and timing of the mobile device. This model is then referenced in real-time to provide a more reliable estimation of device position when positioning technologies are interrupted.

The location data used for training may be aggregated over a period of months to estimate a general geographic area where a user usually is at a certain time of day, or may be used in a more immediate fashion for real-time navigation. Real-time navigation prompts may tell a user when to turn if the route is known and a general history of that route, not necessarily specific to a particular user, is known. An example of this is navigation on a highway, with the known data being the usual traffic patterns at a particular time of day and/or day of week, month, or year. Seasonal predictions may also be used for such circumstances as tourist season, or simple Quarter 1 verses Quarter 2 estimates. A personal history of a user and/or a generic public history of transportation patterns may bee used to predict a mobile device's real-time location For less regular trips, "recent" data, or data from earlier in this trip or day, may be used for prediction of travel. A real-time decision is made based on data that is not in the immediate past but instead on data that is still recent.

The most accurate predictive model would utilize immediate, recent, and archived data in making estimates of real-time position.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of estimating the current location of a mobile device, the method comprising:
   acquiring, by at least one server, a plurality of historical location parameters associated with the mobile device, wherein at least one of the plurality of historical location parameters is data indicative of a prior latitude and longitude of the mobile device acquired by a wireless geographic positioning unit of the mobile device;
   training, by the at least one server, a neural network using the plurality of historical location parameters to produce at least one trip model;
   obtaining, by the at least one server, at least one last known location parameter for the mobile device;
   estimating, by the at least one server, the current location of the mobile device using the at least one last known location parameter for the mobile device and the at least one trip model.

2. The method of claim 1, further comprising:
   identifying at least one location of interest for the mobile device;
   calculating at least one trigger area around the at least one location of interest;

comparing the estimated current location of the mobile device and the at least one trigger area; and outputting an alert to the mobile device if the estimated current location of the mobile device is within the at least one trigger area.

3. The method of claim 2, wherein the location of interest is a location selected from the group consisting of a destination location of the mobile device, an emergency event location and a traffic incident location.

4. The method of claim 2, wherein the location of interest is a location selected from the group consisting of a destination location of the mobile device, an emergency event location and a traffic incident location.

5. The method of claim 1, further comprising outputting the estimated current location of the mobile device.

6. The method in claim 1, wherein generating at least one trip model using the plurality of historical location parameters comprises employing a genetic algorithm to determine a function that models the historical location parameters.

7. The method of claim 1, wherein the mobile device is any device capable of transmitting the location parameters.

8. The method of claim 1, wherein the mobile device is a mobile device chosen from the group comprising a GPS-enabled cell phone, a GPS-enabled laptop, and a GPS-enabled Personal Digital Assistant (PDA).

9. The method of claim 1, wherein the plurality of historical location parameters and the at least one last known location parameter are chosen from the group consisting of data indicative of latitude and longitude, data indicative of a timestamp, data indicative of a wireless signal strength, data indicative of speed, and data indicative of direction of travel.

10. The method of claim 1, wherein the historical location parameters are achieved location parameters.

11. The method of claim 1, wherein the estimated current location is given latitude and longitude coordinates.

12. The method of claim 1, further comprising storing the plurality of historical location parameters at the server.

13. The method of claim 1 further comprising, transferring the estimated current location from the server to the mobile device if the server estimated the current location.

14. The method of claim 1 further comprising, transferring the at least one trip model from the server to the mobile device if the server produced the at least one trip model.

15. The method of claim 1, further comprising storing the plurality of historical location parameters at the mobile device.

16. A method of estimating the current location of a mobile device, the method comprising:

acquiring, by at least one server, a plurality of historical location parameters associated with the mobile device, wherein at least one of the plurality of historical location parameters is data indicative of a prior latitude and longitude of the mobile device acquired by a wireless geographic positioning unit of the mobile device;

storing, by the at least one server, the historical location parameters;

training, by the at least one server, a neural network using the plurality of historical location parameters to produce at least one trip model;

obtaining, by the at least one server, at least one last known location parameter for the mobile device;

estimating, by the at least one server, the current location of the mobile device using the at least one last known location parameter for the mobile device and the at least one trip model.

17. The method of claim 16, wherein the plurality of historical location parameters include parameters for a transit system.

18. The method of claim 17, wherein the transit system's plurality of historical location parameters are collected from an automatic vehicle location service.

19. The method of claim 17, wherein the transit system's plurality of historical location parameters are collected from an archive of the mobile device's previous trips on the transit system.

20. The method of claim 17, wherein the transit system's plurality of historical location parameters are collected from an archive of historic trips of the transit system.

21. The method of claim 17, wherein the transit system's plurality of historical location parameters are collected from the transit system's schedule of arrival and departure times and locations.

22. The method of claim 16, wherein the plurality of historical location parameters include parameters for a mobile device and a transit system.

23. The method of claim 22, wherein the transit system's plurality of historical location parameters are collected from an automatic vehicle location service.

24. The method of claim 22, wherein the transit system's plurality of historical location parameters are collected from an archive of the mobile device's previous trips on the transit system.

25. The method of claim 22, wherein the transit system's plurality of historical location parameters are collected from an archive of historic trips of the transit system.

26. The method of claim 22, wherein the transit system's plurality of historical location parameters are collected from the transit system's schedule of arrival and departure times and locations.

27. The method of claim 22, wherein the plurality of historical location parameters for the mobile device include archived location parameters.

28. The method of claim 16, further comprising outputting the estimated current location of the mobile device.

29. The method of claim 16, further comprising:
identifying at least one location of interest for the mobile device;
calculating at least one trigger area around the at least one location of interest;
comparing the estimated current location of the mobile device and the at least one trigger area; and
outputting an alert to the mobile device if the estimated current location of the mobile device is within the at least one trigger area.

30. The method of claim 16, wherein generating at least one trip model using the plurality of historical location parameters comprises employing a genetic algorithm to determine a function that models the historical location parameters.

31. The method of claim 16, wherein the mobile device is any device capable of transmitting the location parameters.

32. The method of claim 16, wherein the mobile device is a mobile device chosen from the group comprising a GPS-enabled cell phone, a GPS-enabled laptop, and a GPS-enabled Personal Digital Assistant (PDA).

33. The method of claim 16, wherein the plurality of historical location parameters and the at least one last known location parameters are chosen from the group comprising data indicative of latitude and longitude, data indicative of a timestamp, data indicative of a wireless signal strength, data indicative of speed, and data indicative of direction of travel.

34. A system for estimating the current location of a mobile device, the system comprising:
- a mobile device comprising a wireless geographic positioning unit, the wireless geographic unit to acquire a plurality of historical location parameters associated with the mobile device and at least one last known location parameter for the mobile device, wherein at least one of the plurality of historical location parameters is data indicative of a prior latitude and longitude of the mobile device acquired by a wireless geographic positioning unit of the mobile device;
- at least one trip model, the at least one trip model produced by training a neural network using the plurality of historical location parameters associated with the mobile device, the at least one trip model to receive the at least one last known location parameter for the mobile device and to estimate a current location of the mobile device.

35. The system of claim 34, wherein the plurality of historical location parameters and the at least one last known location parameter are chosen from the group consisting of data indicative of latitude and longitude, data indicative of a timestamp, data indicative of a wireless signal strength, data indicative of speed, and data indicative of direction of travel.

36. The system of claim 34, wherein the at least one trip model is a function generated by a genetic algorithm.

37. The system of claim 34, further comprising a server wirelessly coupled to the mobile device.

38. The system of claim 37, wherein the at least one trip model is located at the server.

39. The system of claim 38, wherein estimate of the current location of the mobile device is transmitted from the server to the mobile device.

40. The system of claim 34, wherein the at least one trip model is located at the mobile device.

41. The system of claim 34, further comprising:
- an alert generator coupled to the at least one trip model, the alert generator to output an alert to the mobile device if the estimate of the current location of the mobile device is within a trigger area associated with a location of interest for the mobile device.

* * * * *